United States Patent [19]
Hancock, Jr.

[11] 3,867,128
[45] Feb. 18, 1975

[54] PROCESS FOR PRODUCING HIGH SPECIFIC GRAVITY MATERIAL FROM LOW GRADE IRON ORE

[76] Inventor: James Thomas Hancock, Jr., 11602 Applewood, Houston, Tex. 77024

[22] Filed: Dec. 18, 1972

[21] Appl. No.: 316,232

[52] U.S. Cl. .................... 75/1, 252/8.5 B, 423/632
[51] Int. Cl. ............................................. C22b 1/00
[58] Field of Search ................. 423/138, 632, 633; 252/8.5 B, 472; 75/1, 7

[56] References Cited
UNITED STATES PATENTS

| | | | |
|---|---|---|---|
| 2,119,270 | 5/1938 | De Vecchis | 423/633 |
| 2,298,984 | 10/1942 | Stinson et al. | 252/8.5 B |
| 2,551,874 | 5/1951 | Cerf | 252/8.5 B |
| 2,686,593 | 8/1954 | Vogel et al. | 252/8.5 B |
| 3,238,037 | 3/1966 | Sautier | 75/1 |
| 3,281,235 | 10/1966 | Anna | 75/1 |

Primary Examiner—Sgd. O. R. Vertiz
Assistant Examiner—Brian E. Hearn

[57] ABSTRACT

A process is disclosed whereby low grade iron ores having a minimum specific gravity of about 3.45 are converted to iron oxide containing material having a specific gravity of 4.2 or greater. The process includes calcining under oxidizing conditions of washed and crushed iron ore of low specific gravity followed by a quench and separation step whereby the high specific gravity iron oxide-containing material is recovered from lower specific gravity contaminants. The material thus prepared can be ground to a size suitable for use as a weighting agent in drilling muds meeting the API specifications for such materials.

12 Claims, No Drawings

PROCESS FOR PRODUCING HIGH SPECIFIC GRAVITY MATERIAL FROM LOW GRADE IRON ORE

BACKGROUND OF THE INVENTION

Many thousands of tons of barite are used annually as weighting agents for drilling muds. However, these materials of suitable quality are becoming in short supply leading to extensive importation or more sophisticated beneficiation and, consequently, more expense for the user. Since such large quantities are used, the costs of drilling oil wells is materially increased. Relative pure iron oxide beneficiated by flotation methods have been previously used as weighting agents for drilling muds, but the expense involved in such a treating process made such use uneconomical and barite became the standard weighting agent. A specification was set by the American Petroleum Institute of 4.2 for the specific gravity of barite drilling mud weighting agents. This specification has been attainable with iron ores as stated above by processing the ore by the expensive flotation methods involving the use of expensive chemicals with the attendant limited recovery of processed materials. Some iron ores are susceptible to beneficiation by the flotation process often with great difficulty, if at all. Hydrated oxides of iron such as limonite, goethite, and the like have been found to be difficult to separate from silica, clay and other gangue materials by flotation methods.

While large deposits of iron ores are unsuitable for use in the economical manufacture of iron by the usual beneficiation methods, i.e., reductive calcination, they would be useful as weighting agents for drilling muds if the specific gravity could be economically increased to meet the API specifications. They would thus be available as a substitute for barite as a weighting agent for drilling muds.

Another problem associated with the use of iron containing materials as weighting agents for drilling mud is the fact that they are often rendered magnetic by methods of processing same. Of course magnetic materials are unacceptable for the use of drilling muds since they tend to flocculate and destroy the stability of the drilling mud.

Accordingly, it is the object of this invention to provide a process for improving the specific gravity of low grade iron ore having a specific gravity as low as 3.45 such that it can be used as a satisfactory weighting agent for drilling mud.

It is a further object of this invention to increase without rendering the resulting material magnetic, the specific gravity from the 3.6 to 3.9 range, attainable by crushing and washing iron ore to silica, clay and other gangue materials, to at least 4.2

SUMMARY OF THE INVENTION

In the process of my invention, low grade raw iron ores have a specific gravity of about 3.45 are upgraded to a product having a specific gravity of 4.2 or more which is suitable once being ground to proper size for use as a weighting agent for drilling mud. The raw ore as taken from the ground is first crushed and washed to remove fine particles and clay and other matter having lower specific gravities. The treatment above often increases the specific gravity to about 3.6 or higher, sometimes as high as 3.9. Washed ore is then charged to kiln where it is calcined under oxidizing conditions to produce stable iron oxide-containing material. The calcining step is carried out at a temperature of from about 1700° F. to about 2,050° F. with residence time in the kiln at the reaction temperatures of at least about 20 minutes. The material is then quenched in a suitable medium such as air or water where the particles and a further separation of the final product from unwanted low specific gravity materials such as silica which had remained with the iron oxide during the calcining step is accomplished.

The recovered iron oxide-containing product is then ground to a size to meet specifications, i.e., such that at least 97 percent of the particles pass through a 200 mesh screen. These recovered materials have a specific gravity of 4.2 or even higher and are suitable for the use to impart weight to drilling mud.

DESCRIPTION OF THE INVENTION

Materials used in drilling fluids to increase the density of said fluids should be of high specific gravity; should not be reactive with the continuous phase of the drilling fluids; should be substantially insoluble in the continuous phase of the drilling fluid; should be ground to an optimum particle size distribution and should be relatively non-abrasive when ground. Low grade iron ores having a specific gravity down to about 3.45 which have been treated in the process of my invention meet the above criteria since the specific gravity is enhanced to equal or exceed the API specifications; the oxides of iron are not reactive with, nor soluble in, the continuous phase of the drilling fluid; the optimum particle size distribution can be easily attained; and, when treated in the process of my invention, the iron oxide-containing material is sufficiently separated from abrasive silica contaminants of iron ore such that is is relatively non-abrasive.

Additionally, since iron is involved, it must have the additional property of being substantially non-magnetic. Iron ore treated according to the practice of my invention meets this criteria also. Therefore, the practice of the invention hereinafter described operates substantially to reduce the costs of drilling fluids and accomplishes significant savings in the exploration for petroleum products since the iron ores treated through the process of my invention result in iron oxide-containing material meeting all the criteria necessary for an outstanding weighting agent for drilling fluids.

A wide variety of iron ores are available for use in the practice of my invention and, since high grade or high iron ores would normally go into a reduction beneficiation process ultimately resulting in the use for the production of steel, low grade or low iron ores are particularly attractive for use in the practice of my invention. Ores containing the goethite form of iron, $Fe_2O_3 \cdot H_2O$, are particularly adaptable to the practice of my invention. Iron ores characterized as limonite are also useful in the practice of my invention. This ore is usually given an empirical formula of $Fe_2O_3 \cdot nH_2O$ since the amount of hydrated water varies with the deposit and is often found as a mixture of goethite and hematite.

In its prue form the mineral goethite has a specific gravity of about 4.3. Unfortunately, goethite as found in the earth in commercial quantities intimately connected with sand, clay and other low specific gravity impurities resulting in an overall specific gravity of somewhat less than 4.0 and often as low as 3.5. Of course to be acceptable for the use as a weighting agent in drilling fluids, the ore must be beneficiated to the point where the specific gravity is 4.2 or greater. In fact high-grade goethite ores have seldom been found in commercial quantities. Significant quantities of goethite or limonite, are found in iron ore deposits in East Texas and Arkansas. Often it is found as a mixture of oxides of iron with hematite, $Fe_2O_3$, in these deposits. Of course it is well known that hematite in certain of its forms has ferromagnetic properties. As will be seen in the later discussion of the practice of my invention, the final iron oxide-containing product surprisingly does not have the undersirable magnetic properties.

From the discussion of my invention which follows, it will be clear to one skilled in the art how to modify the process to accommodate other ores not specifically discussed herein. Since the final product still will probably contain some impurities and is not a pure iron oxide, the term used herein for the product of my invention is "iron oxide-containing" product or material.

When the raw iron ore is first mined, it is crushed to reduce the particle size and to break up and loosen attached clay and sand in addition to reducing the size of the iron ore particle to be treated in the practice of my invention. While it is possible to practice the process of my invention wherein the particles are about one and one-half inch in size, it is more advantageous if the crushing is such that the material treated will pass through a ¾-inch screen. It is preferred that the material be of the size to pass a ½-inch screen and remain on a ⅛-inch screen, but it should be understood that particles passing through this ⅛-inch screen could also be processed to produce a satisfactory product. It is preferred to use a more coarse particle as hereinafter described and especially preferred to use a particle which would pass a ⅜-inch screen and yet be retained on a ⅛-inch screen. This would allow for more uniform and efficient calcination and oxidation to occur.

After crushing, the raw ore is generally washed to remove clay and sand particles accompanying the ore. The remaining silica-containing compounds in the ore are removed only with substantial difficulty. Surprisingly, later steps in the process of my invention accomplishes this result such that the desired specific gravity can be achieved. There are a number of classes or washers which are satisfactory for this process such as a screening, classifying and streaming washer. Examples of a screening washer would be a trommel and classifying washers such as drum, puddling, log, and the like, are also applicable. These pieces of equipment are well known to those skilled in the art of beneficiating iron ores.

Machines commonly used in washing iron ores are log washers and rake or spiral classifiers. These are particularly useful in the practice of my invention for this washing step. Should the iron ore not respond to simple washing methods, a jigging method could be added which is also a well known technique for separating difficultly removed clay from the raw ore.

After washing the crushed ore, it may either be stored for a period of time or moved directly to the calcining step which is the important feature of the invention. Of course after the crushing and washing, a certain amount of the low specific gravity material has been removed and the specific gravity of the remaining iron ore has been increased. For example, I have discovered that an East Texas goethite/limonite ore would have a specific gravity of about 3.6 to about 3.9, depending upon the quality of the new ore, at this stage of the beneficiation process. The practice of my invention could be construed to be the continuation of the beneficiation process from this point using a partially beneficiated ore as well as the entire integrated procedures starting with raw ore. For want of a beter word, the step leading to the production of the desired product will be called a calcination step. Calcination generally used to produce metallic iron from iron ore is understood to be a reduction reaction where in addition to the iron ore, reducing agents such as carbon for example, are present in the reactor with the iron ore being reduced. This classical calcination process stops short of producing molten iron but is used to provide a suitable feed for the production of iron.

Such reduction must not occur in the practice of my invention as the calcination is to be carried out in an oxidizing atmosphere accomplished in those ways well known in the art such as, for example by having a lean ratio of gas and air, by directing the burners of the calcining kiln used such that the flame of the burner does not impinge upon the iron being oxidized, and assuring that the combustion gases from said burner do not contact the material prior to significant dilution of said gases with air. Since these combustion gases contain reducing agents such as carbon monoxide, it is highly important to minimize any such contact. It is well known excess air can be drawn or forced through the kiln to aid in minimizing the contact.

In the calcining process wherein the iron ore is oxidized, the temperature is controlled within the range of about 1700° to about 2050° F. and the material being treated is maintained at this temperature for at least about 20 minutes. This time will vary somewhat depending upon the particle size and the uniformity of the material being treated but a preferred time of treatment at the aforementioned temperature range is from 30 to 45 minutes. Greater times can be used but no substantial benefit is derived therefrom and for reasons of economy longer times are preferably avoided. The preferred temperature range in which to carry out the calcination, or oxidation reaction, in the calcining kiln is from about 1,800° to about 2,000° F. and an especially preferred range from about 1,850° F. to about 1950° F.

Those skilled in the art, of course, understand that the feed rate to the kiln will be determined by the size and type of the kiln and the rate necessary to maintain the aforementioned residence times therein. A wide latitude of feed rates are available if a rotary kiln is used and depend upon the size, slope and rotational speed used. Those skilled in the art will understand that the residence time for a particular size kiln can be changed by altering its slope and rotational speed.

Lower temperatures have been found not to produce the desired increase in specific gravity and the 1700° F. temperature mentioned above should be considered a lower limit. When exceeding the temperature of about 2050° F. the oxides of iron in the product tend to become magnetic and thus not usable as drilling fluids unless the magnetic particles are separated from the other material through the use of a magnetic separator.

In carrying out the calcining, or oxidation step, it should be understood that rotary kilns are not the only type of machinery useful, even though preferred. Vertical kilns and even furnace-type kilns are satisfactory for this purpose if a highly oxidizing atmosphere is maintained therein.

The calcined produce discharged from the furnace is then quenched either in air or water to effect further increase of specific gravity. The theory involved, though I do not intend to be bound by the correctness of said theory, concerns the differing rates of expansion and contraction of the iron oxide and the silica and the low specific gravity particles still attached or still present with the iron oxides. The quenching step takes advantage of these differences and particles fracture such that they become more easily separated after quenching thus enhancing the purity, and consequently, the specific gravity of the resulting iron oxide-containing material. I have found that the degree of purity achieved at this point is sufficient to give the desired specific gravity.

If it is desirable to use a water quench, a hopper could be placed below the exit of the kiln with a bucket or screw conveyor to move the material to a stock pile or dryer. It is preferred to introduce a spray into the hopper during the quenching step such that the level of water is maintained to compensate for evaporation and that only a minimum amount of water remains with the iron oxide-containing product as it moves from the quench bath. During the movement of the material from the quench bath to the storage or drying, the oxides of iron can be further separated from the lighter silica particles by a counter current waterwash or other means well known to those skilled in the art such as vibrating screens which will allow the removed silica to fall through.

In addition to the water quench, it is acceptable to air quench the material and also take advantage of the shearing forces set up during the cooling of the silica and oxides of iron. Conventional separation techniques can be followed to remove the lighter weight particles from the oxides of iron during this separation through screening, shaking, or air separation.

It is not necessary to immediately grind the product recovered from the quenched bath in order to be within the scope of my invention. This desired product can be stored for later use or immediately dried and ground in an appropriate mill such as a Raymond mill, ball mill, or hammer mill or the like to a size which is satisfactory for use in drilling mud. The American Petroleum Institute size specification for barites used in drilling mud is a wet-screen analysis allowing a 3.0 percent maximum residue (conversely, 97 percent minimum passing) on U.S. Sieve No. 200 and 5 percent minimum residue on U.S. Sieve No. 325. Surprisingly, the practice of my invention produces an iron oxide-containing product which meets, and typically exceeds, the 4.20 minimum API specific gravity while having the other aforementioned attributes of a drilling mud weighting agent. It is further surprising to note that the iron ore processed in the nature of my invention leaves an iron oxide-containing material exhibiting negligible magnetism, if any.

In view of the foregoing description and the following examples, it will be obvious to one skilled in the art that many modifications are adaptable to different iron ore without departing from the spirit of the described and claimed invention. The following examples are offered to further aid those skilled in the art in the practice of my invention and not to be considered limited on the scope of the invention described herein.

EXAMPLE I

An iron ore (predominantly goethite or limonite) from East Texas was crushed to pass through ½ inch mesh screen and be retained on a ⅛ inch screen and thoroughly washed. This material had a specific gravity of about 3.4 and was slightly magnetic. A portion of the iron ore was calcined in an oven for thirty minutes at 1800° F. with a total heating time of 42 minutes. After calcining it was observed that the material was no longer magnetic and the specific gravity was 4.17.

Another sample of the ground iron ore was calcined at 1800° F. for thirty minutes and then quenched in water. After water quenching, the material was separated from freed low specific gravity impurities, dried, ground and the specific gravity was found to be 4.27, which is above the normal range of barite of 4.20 to 4.25. The high density and non-magnetic qualities of the processed iron ore make it an excellent material as a drilling mud weighting material.

EXAMPLE II

East Texas iron ore (limonite) which had been crushed, washed, and sized at approximately ⅛ inch to ¼ inch had a bulk density of about 106 lb/ft$^3$, air-dry basis. Powdered specimens showed a specific gravity of 3.66 as measured by the LeChatelier Flask Method, according to the procedure specified for use with powdered barite.

Samples of the ore were heated for 30-minute periods at temperatures of 1700°, 1800°, 2000°, and 2200° F. The procedure followed was to place about ½ lb of material in each of two refractory boats, which were then charged into an electric furnace set at the test temperature. All furnace ports were open to assure an oxidizing atmosphere. Charging of refractory boats and their contents to the furnace resulted in loss of heat and a corresponding temperature drop. When the test temperature was regained, timing of the 30-minute calcining period began. At the end of the period, the refractory boats were quickly removed from the furnace. Material in one boat was poured into water and quenched; that in the other boat was poured onto a suitable surface for air-cooling.

The cooled and dried (in the case of water-quenching) materials were reduced to −100 mesh powder by the use of a mortar and pestle and a vibratory ball mill. Specific gravity measurements were than made on the powdered materials. Also, a strong hand-magnet was used to determine whether heat treatment resulted in noticeable magnetization of the material.

The results of the study is shown in Table I:

TABLE I

| Run No. | Treatment Temp., F | Time at Temp. | Sp. Gr. of Air-cooled | Powdered Material Water-quenched |
|---|---|---|---|---|
| 1 | 1700 | 30 min. | 4.23 | 4.15 |
| 2 | 1800 | do. | 4.30 | 4.29 |
| 3 | 1900 | do. | 4.35 | 4.35 |
| 4 | 2000 | do. | 4.31 | 4.32 |
| 5 | 2100 | do. | 4.33 | 4.30 |
| 6 | 2200 | do. | 4.36 | 4.38 |

None of the powdered samples produced from the heat-treated materials showed more than a few magnetic particles. Colors of the powders were various shades of red-brown which became progressively darker with increased temperature. The most noticeable darkening in color was apparent in samples treated at 2100° F., as compared to the lighter shade of red-brown for samples treated at 2000° F.

EXAMPLE III

Approximately 3 cu. yd. of the ore described in Example II was calcined in a natural-gas-fired pilot-plant rotary kiln. Measuring 12 ft. in length and with an inside diameter of 14 in., this kiln had provisions for varying the slope, rotational speed, temperature, and, the kiln atmosphere. A measurement of the specific gravity of a powdered representative sample of the crushed, washed and ground ore gave a value of 3.66.

The initial run of material through the rotary kiln was begun with a hot-zone temperature of 2050° F (optical pyrometer measurement), slope of ½ in/ft, and ½ rpm and a feed rate of about 400 pounds per hour. A normal, blue to very slightly yellow-tipped flame was employed, with the burner pointed slightly upward with respect to the kiln axis. Gas-air mixture was such as to provide a steady flame and an oxidizing atmosphere. Retention time of the material in the kiln was 55 minutes. The calcined product was red to metallic-gray in color, and about 20 percent of the particles were magnetic. With a reduction of hot-zone temperature to about 2000° F (measured on the bed of material in the kiln), the portion of magnetics decreased. When the color of the product became predominantly red with only occasional gray particles, the magnetics had dropped to about 0.5 percent. Continued running and further temperature decrease to about 1960° F followed, but with kiln speed increased to 1 rpm. This provided a retention time of 38 to 40 minutes. Under these conditions, the product was almost wholly red when cooled, and magnetic particles were rare.

Through the use of various kiln conditions, it was found that a consistently red-brown product with a few gray particles could be produced only with very lean gas-air fuel mixtures; optimum hot-zone temperatures (material bed temperature) were in the range of 1900° to 2000° F when the throughput time for the material was 40 minutes. Maintenance of an oxidizing kiln atmosphere was found to be particularly important to the production of a nonmagnetic, red-brown product.

Approximately 3,000 lb of calcined material was produced under the optimum conditions indicated. Specific gravity measurements on powdered representative samples gave values of 4.29 to 4.30.

A representative sample of the raw material used in the rotary-kiln work was calcined at 1900° F in the furnace in the manner described in Example II. The specific gravity of the powdered product was found to be 4.32.

EXAMPLE IV

Approximately 20 tons of East Texas goethite ore was crushed to a size of ½ inch and ⅛ inch and washed. This ore was fed at a feed rate of approximately 2 tons per hour to a rotary kiln 4 feet in diameter and 40 feet long. The burners were directed away from the bed of ore to minimize the contact of conbustion gases and flame against the iron ore being calcined to maximize oxidation of the iron. The kiln temperature in the reaction zone was approximately 1850° F and the residence time was approximately 35 minutes.

A portion of the production of the run was quenched by allowing the calcined material to fall directly from the kiln into a water bath and another portion was sprayed with water as it exited the kiln. Samples from both portions were dried and a specific gravity of 4.32 was determined using the LeChatelier Flask Method according to the procedure specified by the API for powdered barite.

The quenched material was dried and ground in a 54 inches Raymond mill to meet a wet screen analysis (API) of 3.0 percent max residue on a U.S. Sieve No. 200 and 5.0 percent min residue on a U.S. Sieve No. 325. This material was satisfactory for use as a drilling mud weighting agent.

EXAMPLE V

The physical properties of a sample of the iron oxide-containing product prepared in the process of my invention was compared with a sample of barite drilling mud weighting agent. The properties were determined using standard, well known methods. The results are as follows:

|  | API STANDARD | BARITE | PROCESSED IRON ORE |
|---|---|---|---|
| Specific Gravity | 4.20 min | 4.21 | 4.25 |
| Calcium | 250PPM max | 150 | trace |
| Wet Screen Analysis |  |  |  |
| a. Pass No. 200 Screen | 3% max | 99.6% | 100% |
| b. Residue on No. 325 Screen | 5% min | 11.0% | 17% |

The foregoing results show that the iron ore treated in the process of my invention becomes an iron oxide-containing product satisfactory for use as a drilling mud weighting agent.

From the foregoing description of my invention one skilled in the art may make modifications and variations without departing from the scope thereof.

What is claimed is:

1. A process for preparing a non-magnetic iron oxide-containing material having a specific gravity of at least 4.2 from an iron ore having a specific gravity of about 3.6 to about 3.9 which comprises the steps of:
    a. calcining said iron ore under oxidizing conditions at a residence time sufficient to maintain the ore at between about 1700°F. to less than about 2050°F. for at least 20 minutes;
    b. quenching the calcined ore; and
    c. recovering the quenched iron oxide-containing materials; wherein,
    the recovered material is non-magnetic and has a specific gravity of at least 4.2.

2. The process of claim 1 wherein the iron ore has a particle size which will pass through a ½-inch screen and remain on a ⅛-inch screen.

3. The process of claim 2 wherein the ore has a particle size which will pass through a ⅜-inch screen and remain on a ⅛-inch screen.

4. The process of claim 1 wherein the calcining step is carried out in a rotary kiln equipped with at least one gas burner with its flame directed so as not to impinge upon the raw ore.

5. The process of claim 4 wherein said kiln is equipped to provide a forced draft of air during the calcining step.

6. A process for preparing a non-magnetic iron oxide having a specific gravity of at least 4.2 from a raw iron ore having a specific gravity of less than 3.9 which comprises the steps of:
   a. crushing the raw ore to a particle size not greater than 1 ½ inches;
   b. washing the crushed raw ore;
   c. calcining said washed ore under oxidizing conditions at residence time sufficient to maintain the ore at between about 1700°F. and less than about 2050°F. for at least 20 minutes;
   d. quenching the calcined ore; and
   e. recovering the quenched iron oxide-containing material whereby the recovered material is non-magnetic and has a specific gravity of at least 4.2.

7. The process of claim 6 wherein the washed ore is calcined at from about 1800° F. to about 2000° F.

8. The process of claim 7 wherein the washed ore is calcined for a time period of from 30 to about 45 minutes.

9. A process for preparing a non-magnetic iron oxide material having a specific gravity of at least 4.2 from a raw iron ore having a specific gravity of at least 3.45 which comprises the steps of:
   a. crushing the raw ore to a particle size which will pass through a ⅜-inch screen and be retained on a ⅛-inch screen;
   b. washing the crushed raw ore;
   c. calcining the washed ore at a temperature of about 1800°F. to about 2000°F. for from about 30 to about 45 minutes in a rotary kiln equipped with a means producing an air draft and with at least one internal burner directed to avoid impingement of the flame on the iron ore during the calcining step;
   d. quenching the calcined material with water;
   e. recovering the quenched material from low specific gravity materials by a means whereby the iron oxide-containing material is separated from said low specific gravity material; and
   f. grinding the recovered iron oxides to a particle size such that 97 percent of the material will pass through a 200 mesh screen.

10. The process of claim 9 wherein the calcining step is performed at from about 1850° F. to about 1950° F.

11. The process of claim 9 wherein the raw ore is a limonite ore.

12. The process of claim 9 wherein the raw ore is a goethite ore.

* * * * *